Jan. 4, 1966 R. LEE ET AL 3,227,240
AIR MINGLING SOUND SUPPRESSOR FOR JET ENGINE
Filed May 4 1964 2 Sheets-Sheet 2
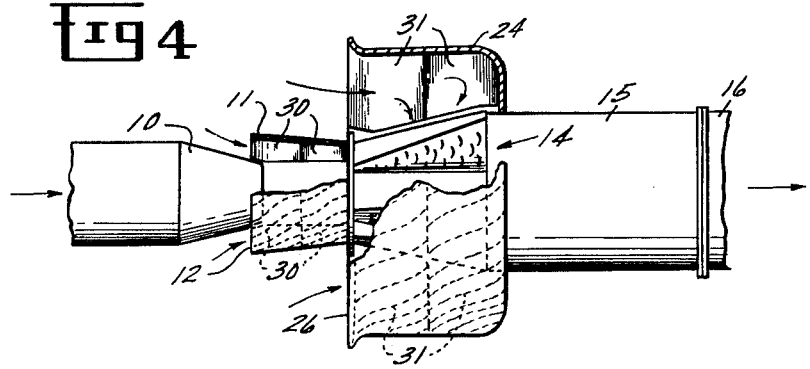
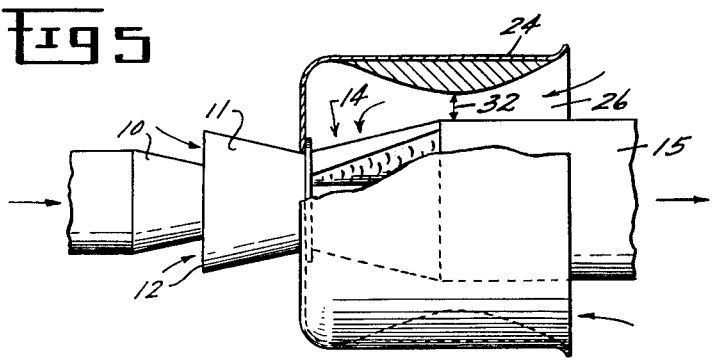
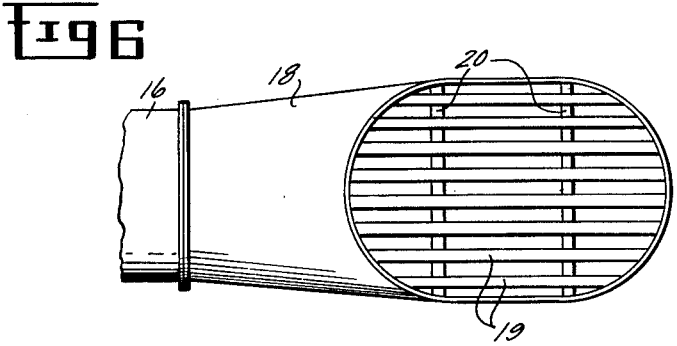
INVENTORS.
HARRY D. SOWERS
ROBERT LEE
BY
John F. Cullen
ATTORNEY United States Patent Office 3,227,240
Patented Jan. 4, 1966

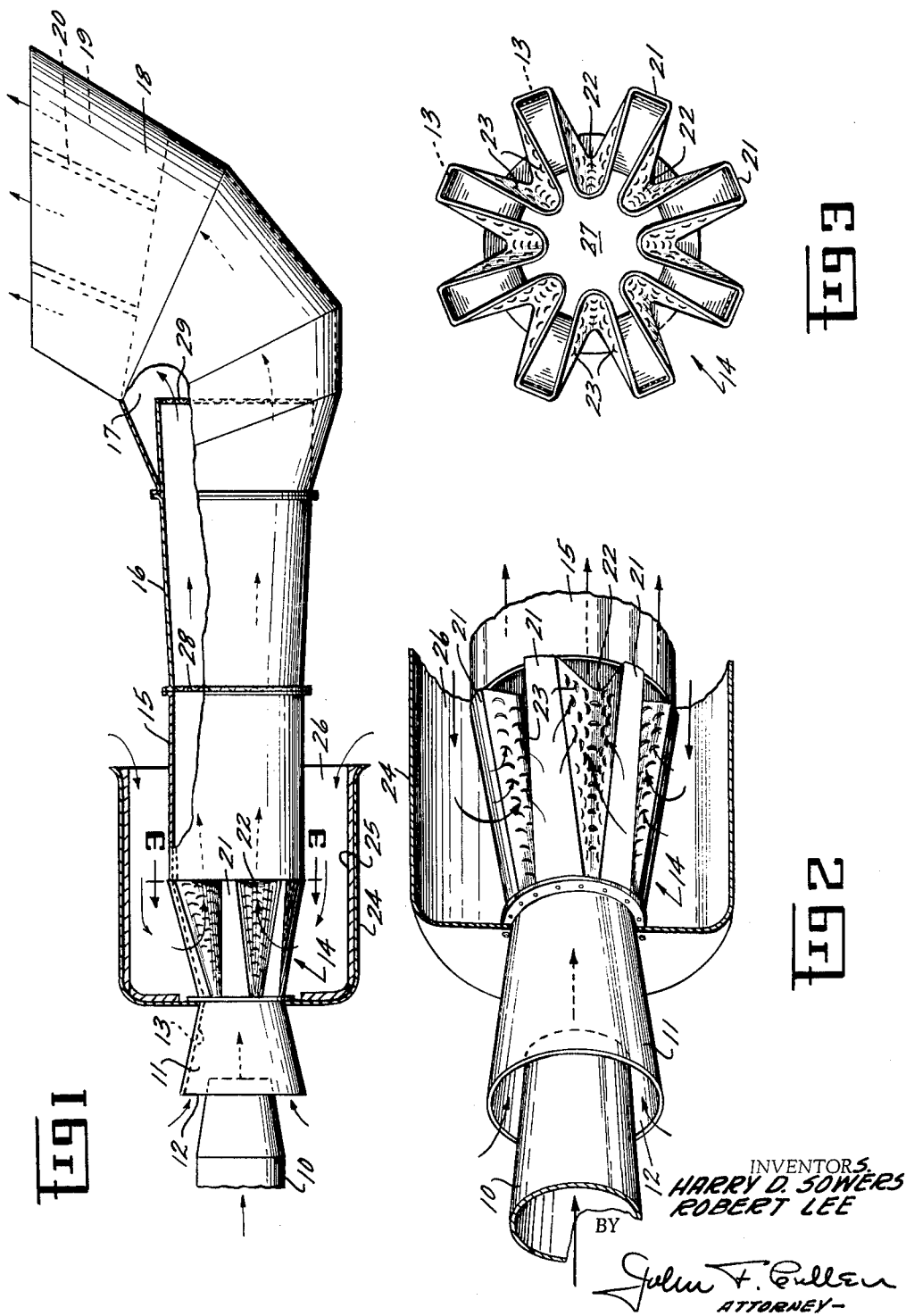

3,227,240
AIR MINGLING SOUND SUPPRESSOR
FOR JET ENGINE
Robert Lee, Arlington, Mass., and Harry D. Sowers, Cincinnati, Ohio, assignors to General Electric Company, a corporation of New York
Filed May 4, 1964, Ser. No. 364,649
11 Claims. (Cl. 181—51)

The present invention relates to a sound suppressor and, more particularly, to a ground or portable sound suppressor for jet aircraft which does not require water for cooling and is adequate for afterburning engine operation.

In the present era of jet powered aircraft, the problem of noise generation has become acute. High intensity noise produced by jet engines during ground run-up operation is hazardous to maintenance personnel and annoying to adjacent residential communities. It can induce hearing damage to maintenance personnel unless they are properly protected and it can cause discomfort and annoyance to citizens located within hearing distance of the site of engine operation as anyone adjacent an airfield can confirm. Also, in severe cases the high intensity noise can induce structural fatigue damage to the airframe and engine parts. Ground run-up operation is a principal offender and this occurs where the engines are merely operated on the ground after overhaul or for various test reasons. In high speed military aircraft it is customary to use afterburning. This is merely additional injection and burning of fuel in a tailpipe for sudden high speed bursts and, during testing, results in a very high level of noise. The need for an effective portable noise suppressor system for aircraft is well recognized especially for military afterburning operation. Logistics and operations considerations require that the noise suppressor be mobile, be easily adaptable to exhaust systems of a variety of aircraft and engines, and be able to function with, and endure, afterburning operations.

During ground run-up operations, military aircraft are placed in the afterburning condition as described above. In order to prevent structural failure in present suppressors due to excessive temperatures, large volumes of water are normally sprayed into the engine exhaust during the afterburner operation. The cooling water requires a source of supply and a pumping system which is many times impractical or impossible to obtain. In addition, the cooling water passing through the suppressor in large quantities is dumped in the test area creating problems of disposal, questionable working areas, and potential hazardous conditions for the maintenance and test personnel.

Previous attempts to provide portable ground run-up suppressors have encountered several problems. For afterburning operation, the designs require large volumes of water for cooling the internal structural members and are therefore undesirable from the viewpoint of portability and the need for a large water supply and associated plumbing accessories. Additionally, the amount of noise reduction generally achievable has not been completely satisfactory, particularly in the low frequency range and within the immediate vicinity, e.g., within a twenty foot radius, of the suppressor.

It has been known to use for mixing of large amounts of secondary air with the exhaust gas stream for sound suppression, but, to applicants' knowledge, none have been successful specifically for use in afterburning operation. For afterburning operation, such suppressors have been limited to water injection suppressors.

The main object of the present invention is to provide a portable waterless noise suppressor for use on a jet engine, including afterburning operation, wherein the construction thereof permits adequate cooling air and mixing air for both cooling and sound suppression to be drawn in near the exhaust nozzle by ejector principles.

A further object is to provide a suppressor of the above type which gives sufficient noise reduction to obviate the high intensity noise over the entire frequency spectrum by proper mixing of the ejector air and hot exhaust gases.

A further object is to provide such a suppressor which eliminates water cooling by a louvered ejector-suppressor component that is adequately film cooled and passes a large amount of air for mixing and sound suppression.

Another object is to provide a diffuser downstream of the ejector-suppressor component to enhance the pumping qualities by creating a desirable pressure differential.

Briefly stated, the invention provides a portable waterless noise suppressor for jet engine use which includes a coupling member funneling the end of the engine exhaust nozzle to receive exhaust gases. The coupling member is spaced from the nozzle to form an ejector cooling air inlet passage around the nozzle. Connected to the coupling member is an ejector-suppressor component of the general daisy type suppressor and this is followed by a tubular mixer section connected thereto. Both the ejector-suppressor component and mixer sections are partially surrounded by an outer casing spaced therefrom to form a secondary air passage. The ejector-suppressor component is peripherally corrugated with the corrugations increasing in radial depth downstream so that alternate outer converging ducts from the secondary air passage are formed and inner diverging exhaust gas ducts are formed therebetween. The inner ducts carry hot exhaust gas and the outer ducts carry cool secondary air. Louvers are provided in the walls of the ducts to direct a portion of the cool secondary air from the converging ducts as a cooling film along the walls of the hot diverging ducts. The hot diverging ducts are film cooled along their outer periphery by ejector air from the ejector cooling air inlet passage around the nozzle. Both the converging and diverging ducts discharge into the mixer section. A diffuser section is connected to the mixer for further mixing, sound attenuation, and pressure reduction for better pumping of secondary air through the ejector-suppressor component. The diffuser section dumps into a plenum which may discharge to atmosphere through a suitably baffled stack arrangement.

While the specification concludes with claims particularly pointing out and distinctly claiming the subject matter which is regarded as the invention, it is believed the invention will be better understood from the following description taken in connection with the accompanying drawing in which:

FIG. 1 is a schematic cross-sectional view of the overall arrangement of the suppressor;

FIG. 2 is a fragmentary perspective view of the primary elements of the invention;

FIG. 3 is a cross section taken on the line 3—3 of FIG. 1;

FIG. 4 is a fragmentary sectional view of a modification of the coupling member illustrating a different flow of secondary air;

FIG. 5 is a partial cross-sectional view of a modification of the outer casing forming the secondary air passage; and FIG. 6 is a plan view of a typical stack baffling.

The basic purpose of the suppressor is two-fold. First, it is intended to provide sufficient noise reduction to obviate the disadvantages noted above relating to hearing damage, discomfort and annoyance and structural fatigue. Second, it is intended to provide a unique ejector-suppressor combination to draw in ambient air for cooling in large quantities adequate for afterburner operation and thus obviate the need for water cooling with its consequent problems of supply and necessary components.

Referring first to FIG. 1, the general arrangement of the invention is shown. It is portable by being easily set up and disassembled or moved on a dolly not shown. The hot high velocity gases, that may be straight jet gases or the result of afterburner operation, issue from exhaust nozzle 10 in the conventional manner. In order to capture the exhaust gases and couple the suppressor system to the engine and to provide ambient cooling air to the suppressor itself, as will later be described, there is provided a coupling member 11 which may be coned as shown or any suitable shape to capture the exhaust gases. To provide the cooling capacity that is necessary, coupling member 11, in addition to funneling the exhaust gases, is spaced from nozzle 10 to form an air inlet passage 12 around the nozzle. It will be apparent that the ejector action of the exhaust gases from nozzle 10 will cause airflow through passage 12 into coupling member 11. Also, the shearing action between the relatively slow moving inlet cooling air in passage 12 and the high velocity exhaust gas tends to reduce the velocity gradient across the juncture between the two and thus reduce the noise generated by the exhaust gas. In other words, a lower noise level results merely by the coming together of the two streams at this point as is well known. More importantly, coupling member 11 serves to direct a film of cooling air 13 along the inner surface of the coupling member and into the ejector-suppressor as is shown in the dotted line of FIG. 1. The hot gases and air from film cooled coupling member 11 are received by an ejector-suppressor component 14 which is more clearly shown in FIG. 2, and will be more completely described later. To complete the overall system, component 14 is connected to a mixer section 15 downstream thereof whose function is to receive the mixed hot and cold fluids and mix them to reduce the velocity and temperature of the fluid and then discharges into a downstream conical diffuser 16. The diffuser 16 lowers the static pressure of the system in the region of the ejector-suppressor component 14 to increase pumping capability and also reduces the excessive discharge velocity of the mixed gases for noise reduction by diffusing the flow. The exhaust gases are then discharged into a plenum 17 and directed up a stack 18 containing baffles 19 and 20 of sound absorptive material as will later be explained.

Referring to FIG. 2, wherein the critical and primary elements are more clearly shown, it will be seen that the ejector-suppressor component 14, which is connected to coupling member 11 to internally receive the hot exhaust gases, is generally conical in shape in the downstream direction. This is similar to and is a modified form of a well known daisy suppressor. As such, it consists of a multiplicity of lobes formed by being peripherally corrugated as shown. These corrugations result in a series of crests 21 forming essentially tangential solid outer walls and of troughs or valleys 22. Preferably the crests 21 form substantially flat, preferably tangential walls as shown in FIG. 3 although they are not confined to this exact flat configuration and the word "tangential" is used for convenience to indicate the outermost portions forming the crest of the lobes as shown in FIG. 2 regardless of the exact shape. Similarly, the troughs 22 are preferably formed curved as shown in FIGS. 2 and 3 for satisfactory operation although this exact shape is not critical.

As thus shown in FIG. 2, it will be noted that the corrugations forming the crests and valleys increase in radial depth in the downstream direction to form alternate outer converging ducts represented by trough 22 and inner diverging ducts represented by the inner portion of crest or wall 21. The troughs 22 are provided with a multiplicity of louvers 23 in the side walls thereof which side walls consist of a complete trough and these louvers extend out the radial side walls to the outer wall 21 as indicated.

In order to provide the large amount of secondary cooling air that is required during afterburning operation, an outer suitable shaped tubular casing 24, which may be lined with a sound absorbent material 25, is provided to form a secondary air passage 26. This casing element may be folded or cup-shaped and closed on the coupling member 11 to open downstream as shown in FIGS. 1 and 2 merely to provide a convenient arrangement so that many airplane end sections may be accommodated without interference. The modification of FIG. 4 illustrates entry to the casing from the opposite end. Casing 24 guides large quantities of outside air into the ejector-suppressor outer converging ducts or troughs 22 with minimum interference with any aircraft tail components. Additionally, casing 24 shields the sound generated within the suppressor system from direct outward radiation and tends to absorb the sound during its passage rearward. For convenience, casing 24 overlaps and is spaced from the suppressor component 14 and downstream mixer section 15. This is merely to insure proper cooling fluid flow and sufficient flow to the suppressor.

It should be noted that any number of lobes or crests and troughs 21 and 22 may be used to provide multiple channels for sufficient air to enter the suppressor and mix with the exhaust gases to adequately lower the exhaust gas temperature and prevent structural failure of the downstream portions due to excessive temperatures. With these multiple channels and their louvers 23, large quantities of ambient air enter the suppressor and mix with the exhaust gases to lower the exhaust gas temperature and velocity thus lowering the noise generated by the exhaust jet. It will be apparent that both cooling and mixing are accomplished by the interaction of the converging and diverging ducts all dumping into mixer section 15.

In operation thus far, and still referencing FIG. 2, it will be apparent that the exhaust gas jet induces, by ejector action, the inflow of ambient air through passage 12 and coupling member 11 to bathe the inner surface of the coupling member with a cooling air film 13 as shown in FIG. 1. Additionally, the juncture of the two fluids with different relative velocities, tends to reduce the velocity gradient thus reducing the sound lever. The cooling film 13 continues on into the ejector-suppressor component 14 and flows outwardly along the inner surface of the crest or tangential wall 21 of the inner diverging duct. Thus, these inner walls are bathed with a film of cool air. Additionally, the high velocity exhaust gas from nozzle 10 results in a lower pressure within the ejector-suppressor component 14 which induces entry of secondary air through passage 26 and into outer converging ducts or troughs 22. Passing through the troughs and crests all of the induced air and exhaust gases are then dumped into mixer section 15. Because of the static pressure difference between the inner hot gas core and the outer induced cool air, some of the outer cool air from passage 26, as it flows through converging ducts 22, also flows through louvers 23 to bathe the inner surface of the diverging ducts to thus cool said ducts. This is the surface that is exposed to the hot exhaust gases. Thus, there is a double flow of cooling air to provide a complete film cooled inner surface of the hot duct part of the ejector-suppressor. Most of the secondary air passes through the converging ducts 22 where it is dumped into the mixer section to mix with the hot exhaust gases.

The length of mixer 15 is sufficient to allow mixing of the secondary air with the engine discharge gas to insure sufficient temperature reduction during afterburner operation. In order to further induce or improve the pumping action of secondary air, a conical diffuser 16 is connected to mixer 15. The diffuser lowers the static pressure of the system in the region of the ejector-suppressor component. The resultant increase in the ejector pumping capability further reduces the discharge velocity after mixing has taken place resulting in still further noise reduction.

Notwithstanding the components as described, there is still a tendency for a hot core of exhaust gas to continue on through the system as shown at 27 in FIG. 3. This results in a velocity profile across the mixer that is high in the center. Since the noise level is proportional to the velocity to the eighth power, it will be appreciated that the velocity peak must be reduced. This may be reduced further by insertion of a foraminated or screen element 28 at the inlet end of the diffuser. This tends to break up the high velocity flow along the centerline of the suppressor, thus lowering the velocity profile and the noise. An additional screen 29 may be placed at the diffuser outlet to increase the pressure in the diffuser and prevent separation from the walls thus insuring proper diffusion and velocity reduction. For small angle diffusers screen 29 may not be required for this specific purpose. Both screens provide noise reduction by further reducing the high velocity flow along the centerline of the suppressor.

In order to further reduce velocity and thus the noise level, a plenum 17 is connected at the discharge of the diffuser into which the mixed cooled gases may further expand. The plenum, in turn, directs the discharge into stack 18. The stack may be provided with suitable sound absorption sheets or baffles 19 that are mounted parallel to the flow as shown generally in FIG. 6 to absorb the mid frequency sound and the spacing and number of these may may be varied as required to allow expansion into the plenum, the baffles are spaced from the end of the diffuser. In order to absorb additional high frequency sound suitable sound absorption baffles 20 perpendicular to baffles 19 may be provided as needed.

It is possible to further attenuate the transmission of sound by the modification shown in FIG. 4 wherein like numerals refer to like parts. In this figure suitable baffles 30 may be provided in passage 12 to provide for the incoming ambient air but to prevent a line-of-sight path for the outgoing sound. Of course there must be a trade-off between the restrictions offered by the baffles to the incoming air flow and the sound attenuation desired. Similarly, baffles 31 may be provided in secondary air inlet passage 26 for a similar purpose. In both cases, the passages 26 and 12 may be larger due to the baffle restriction. This figure also shows that the secondary air inlet may not be confined to the reverse or folded flow arrangement as shown in FIGS. 1 and 2 but may enter at the opposite end as shown. Any suitable means of getting the air into the ejector-suppressor component 14 is satisfactory and the reverse flow arrangement of FIGS. 1 and 2 has the advantage of an easier insulated and tortuous path for the outgoing sound as well as less interference with aircraft tail end components.

A further modification is shown in FIG. 5 wherein, by proper designs, it is possible to use a venturi section in the secondary inlet passage, regardless of which end the air enters. The venturi provides a throat 32 to provide choked flow or sonic velocity. Such a configuration prevents the sound in the ejector-suppressor from being propagated back out through passage 26.

The venturi arrangement prevents the passage of sound upstream of the secondary passage whereas the baffle arrangements attenuates the sound movement upstream of the passage.

It will be apparent that the coupling member 11, in conjunction with the multi-element ejector-suppressor component 14 permits a large amount of secondary air to be pumped into the compressor for cooling. The multiplicity of the ejector-suppressor elements tends to reduce the length of the mixer and diffuser component required by providing more air for mixing of the secondary and primary exhaust gas flows and also reduces the noise level. The louvered design allows film cooling to take place in the hot parts in conjunction with the film cooling from the air in passage 12. The conical diffuser further increases the pumping capability of the ejector-suppressor component and lowers the final discharge velocity for further noise reduction. All of these components thus perform to provide significant reduction and a waterless suppressor that is usable in afterburning operation.

While there have been described preferred forms of the invention, obvious modifications and variations are possible in light of the above teachings. It is therefore to be understood that within the scope of the appended claims, the invention may be practiced otherwise than as specifically described.

We claim:

1. A portable waterless noise suppressor for use on a jet engine exhaust nozzle comprising, a coupling member funneling the end of said nozzle to receive exhaust gases and spaced therefrom to form an ejector cooling air inlet passage around said nozzle, an ejector-suppressor component connected to said member, a tubular mixer section connected to said component, an outer casing spaced from said component and mixer to form a passage for secondary air, said component being peripherally corrugated, the corrugations increasing in radial depth in the downstream direction to form alternate outer converging ducts connected to said secondary air passage and inner diverging exhaust gas ducts connected to said coupling member interior, louvers in the walls of said ducts to direct some secondary air from the converging ducts as a cooling film along the walls of the diverging ducts with said ejector cooling air, said ducts discharging into said mixer, a diffuser section connected to said mixer and a plenum connected to said diffuser and discharging to atmosphere.

2. Apparatus as described in claim 1 wherein said corrugations have side walls joined by a tangential outer wall and said louvers are in the side walls to direct a cooling film of secondary air from the converging ducts to said walls in the diverging ducts while the inner tangential walls receive the ejector air as a cooling film.

3. Apparatus as described in claim 1 wherein said plenum is connected to a stack member containing absorptive material.

4. Apparatus as described in claim 1 wherein a screen member is disposed across the flow at the diffuser outlet.

5. Apparatus as described in claim 1 wherein screen members are disposed across the flow at each end of the diffuser.

6. Apparatus as described in claim 1 wherein the outer casing forms a cup-like member closed on the coupling member and opening in the downstream direction for reverse flow of said secondary air, and sound absorbing material is disposed on the inner surface of said casing member.

7. Apparatus as described in claim 1 wherein the outer casing forms a venturi-section in said secondary air passage with a choked throat to prevent passage of sound upstream of said secondary passage.

8. Apparatus as described in claim 1 wherein said coupling member is provided with baffles in said ejector cooling air inlet passage to attenuate the sound movement upstream of said inlet passage.

9. Apparatus as described in claim 1 wherein baffles are provided in said secondary air passage within said outer casing for sound attenuation.

10. Apparatus as described in claim 3 wherein said absorptive material comprises spaced sound absorption baffles parallel to the flow to absorb mid frequency sound and said sheets are spaced from the end of the diffuser.

11. Apparatus as described in claim 10 wherein additional spaced sound absorption sheets are provided perpendicular to said first spaced sound absorption sheets to absorb high frequency sound.

References Cited by the Examiner

UNITED STATES PATENTS

| | | | |
|---|---|---|---|
| 2,674,335 | 4/1954 | Lemmerman | 181—42 |
| 2,735,633 | 2/1956 | Manning | 181—33.221 |
| 2,987,136 | 6/1961 | Lilley et al. | 181—33.221 |
| 3,027,710 | 4/1962 | Maytner | 181—33.221 |
| 3,151,701 | 10/1964 | Duthion et al. | 181—33.221 |
| 3,174,581 | 2/1965 | Duthion et al. | 181—33.221 |

FOREIGN PATENTS 829,012  2/1960  Great Britain.

LEO SMILOW, *Primary Examiner.*